Patented Nov. 7, 1939

2,178,763

UNITED STATES PATENT OFFICE 2,178,763

PURIFICATION OF CADMIUM

William J. O'Brien, Gates Mills, Ohio, assignor to The Glidden Company, Cleveland, Ohio, a corporation of Ohio No Drawing. Application August 12, 1938, Serial No. 224,509

14 Claims. (Cl. 75—71)

The present invention relates to a process whereby cadmium metal is produced of substantially 100% purity, and more particularly it relates to the purification of material containing cadmium and zinc, such as cadmium sponge to recover cadmium of a high degree of purity.

The use of fused caustic soda in the purification of cadmium zinc residues, such as cadmium sponge, obtained by precipitation of cadmium solution on zinc slabs, is known. The caustic soda forms salts with zinc, namely sodium zincate, which are insoluble in cadmium and moreover the caustic soda does not attack the cadmium.

According to the present invention a process is provided whereby the amount of zinc removed is increased, the recovery of cadmium is increased, and the time required for effecting the purification by caustic fusion is reduced.

It has been found that the addition of salts to the caustic fusion affect the degree of removal of the impurities. It has been found that the addition of alkali and alkaline earth chlorides and fluorides, such as sodium chloride, sodium fluoride, calcium fluoride, etc., to the fusion reduced the zinc contamination of the recovered cadmium, improved the recovery, and speeded up the fusion, cadmium sponge visibly diffusing more rapidly in the salt treated fusion. Also when wet sponge is treated the foaming is materially reduced. The salts greatly increase the fusibility and it is believed that this permits the caustic to more readily take up the zinc, resulting in increased removal of zinc, increased cadmium recovery and decreased time required for the treatment, although the applicant does not wish to be limited to any theory.

Moreover, cadmium sponge ordinarily contains some nickel which is not removed by the ordinary fusion. The addition of sodium chloride, for example, to the fusion cuts down the nickel contamination of the recovered cadmium about half. Sodium fluoride results in a somewhat higher recovery than sodium chloride but the purification is not quite as efficient as with sodium chloride. The addition of borax to the fusion reduces the zinc contamination to about one-third but when used with the salts contemplated by the present invention, such as sodium chloride, the zinc contamination is nil.

It is preferred to treat wet freshly precipitated sponge as better recovery and purification is obtained. The recovery may be made as effective with dry sponge as wet by the addition of a carbonaceous reducing agent, such as lamp black, but the added reducing agents prevent the removal of nickel.

The purified cadmium is sufficiently low in zinc and nickel that it may be directly dissolved in acid, for use in the making of cadmium pigments for example. While the purified cadmium contains some iron and copper, these are easily removed from cadmium solutions by known methods. However, if a pure cadmium is desired, the zinc content of the caustic soda purified material is so low, that distillation produces apparently 100% pure cadmium, tests for zinc, copper, iron and nickel all being negative.

The following examples are illustrative of the invention.

Example I

Pressed wet freshly precipitated cadmium sponge _____gallons__ 3
Caustic soda _____pounds__ 14
Sodium chloride _____do____ 2
Sodium fluoride _____do____ 1
Borax _____do____ ½

The caustic soda was first melted in an iron pot and the salts added and stirred in until completely diffused. The melt was held at about 350° C. and the wet sponge added cautiously to keep down spattering and foaming. When all of the sponge is in, the bottom of the pot was well stirred where most of the sponge was found encrusted with the salts of the caustic fusion. This stirring was kept up until no more resistance was obtained in the bottom of the pot and all of the material seemed fluid. The temperature was raised to about 450° C. during this treatment. After the material became fluid the stirring of the bottom of the pot was discontinued and the heating continued until all of the foam disappeared after which the fusion was rapidly heated to about 550° C. and the heat was cut off. The molten cadmium was then separated from the fusion. The cadmium recovery was approximately 95% and the cadmium recovered contained .025% zinc and 0.10% nickel. The cadmium recovered by fusion with caustic soda alone showed about 8% zinc and 0.145% nickel.

The cadmium recovered as above was then distilled at about 800° C. in an atmosphere of nitrogen. The cadmium recovered apparently was 100% pure cadmium, tests for zinc, copper, nickel and iron being negative.

Example II 129 pounds of pressed cadmium sponge containing 28% water was treated as in Example I with a fusion consisting of 85 lbs. caustic soda, 15 lbs. sodium fluoride and 3 lbs. borax. The metal recovered from the fusion contained 0.36% zinc and 0.12% nickel. The yield was 110.5 lbs. of metal. The total time required for fusing caustic through the cleaning of the pot for the next fusion is five hours.

Example III

Another batch was treated as in Example II except that 10 pounds of sodium chloride was substituted for a like amount of sodium fluoride. The metal recovered contained 0.22% zinc and 0.08% nickel. The yield was somewhat less than in Example II, about 100 pounds of metal being recovered.

The zinc is removed by the formation of sodium zincate which is insoluble in the cadmium metal and is removed with the spent caustic. The spent caustic may be leached with water to remove all water solubles, and the unrecovered cadmium is formed in the residue in one of two forms, (1) granular particles which can be readily separated by settling and added to the fusion pot, and (2) some cadmium hydroxide mixed with oxides of iron, copper, nickel, etc. which can be dissolved with sulfuric acid and returned to the electrolytic precipitation vats.

Any caustic alkali may be used but caustic soda is preferred. Also other alkali metal chlorides and fluorides, as well as alkaline earth chlorides and fluorides may be used. Alkali borates other than borax may also be used.

Reference has been made throughout the specification to cadmium sponge but it is to be understood that other cadmium residues containing zinc, such as cadmium drosses, may be treated in accordance with the invention.

I claim:

1. The process of purifying metallic cadmium containing zinc, which comprises treating the impure molten cadmium with a fused alkali caustic containing salts selected from the class consisting of alkali and alkaline earth fluorides and chlorides.

2. The process of purifying metallic cadmium containing zinc which comprises treating the impure molten cadmium with a fused alkali caustic containing salts selected from the class consisting of alkali and alkaline earth fluorides and chlorides together with an alkali borate.

3. The process of purifying cadmium sponge containing zinc which comprises treating the cadmium sponge in molten condition with molten caustic alkali containing a salt selected from the class consisting of alkali and alkaline earth chlorides and fluorides.

4. The process of purifying cadmium sponge containing zinc which comprises treating the wet freshly precipitated cadmium sponge with molten caustic alkali containing a salt selected from the class consisting of alkali and alkaline earth chlorides and fluorides and heating to reduce the cadmium to the molten state.

5. The process of purifying cadmium sponge containing zinc which comprises adding the wet freshly precipitated cadmium sponge to molten caustic alkali containing a salt selected from the class consisting of alkali and alkaline earth chlorides and fluorides, and heating to reduce the cadmium to the molten state.

6. The process of purifying cadmium sponge containing zinc which comprises gradually adding wet freshly precipitated cadmium sponge to molten caustic alkali containing a salt selected from the class consisting of alkali and alkaline earth chlorides and fluorides, and heating to reduce the cadmium to the molten state.

7. The process of purifying cadmium sponge containing zinc which comprises gradually adding the wet freshly precipitated cadmium sponge to molten caustic alkali containing a salt selected from the class consisting of alkali and alkaline earth chlorides and fluorides, heating to a temperature between 350° and 450° C. to reduce the cadmium to the molten state and continuing the heating until all of the water has been removed as evidenced by the disappearance of foaming, finally heating to about 550° C. and separating the purified cadmium from the spent caustic.

8. The process of purifying cadmium sponge containing zinc, which comprises gradually adding the wet freshly precipitated sponge to molten caustic soda containing borax, and a salt selected from the class consisting of alkali and alkaline earth chlorides and fluorides, heating to between about 350° C. and about 450° C. to reduce the cadmium to the molten state, continuing the heating until all of the water has been removed as evidenced by disappearance of foaming, finally heating to about 550° C. and separating the purified cadmium from the spent caustic.

9. The process of purifying cadmium sponge containing zinc which comprises gradually adding wet freshly precipitated cadmium sponge to molten caustic soda containing sodium fluoride and heating to reduce the cadmium to the molten state.

10. The process of purifying cadmium sponge containing zinc which comprises gradually adding wet freshly precipitated cadmium sponge to molten caustic soda containing sodium chloride, and heating to reduce the cadmium to the molten state.

11. The process of purifying cadmium sponge containing zinc which comprises gradually adding wet freshly precipitated cadmium sponge to molten caustic soda containing sodium chloride and sodium fluoride, and heating to reduce the cadmium to a molten state.

12. The process of purifying cadmium sponge containing zinc which comprises adding wet freshly precipitated cadmium sponge to molten caustic soda containing sodium fluoride and borax, and heating to reduce the cadmium to the molten state.

13. The process of purifying metallic cadmium containing zinc which comprises treating the impure molten cadmium with a fused alkali caustic containing a salt selected from the class consisting of alkali and alkaline earth chlorides and fluorides to remove substantially all of the zinc therefrom, separating the substantially zinc free cadmium from the spent caustic, and distilling the cadmium under non-oxidizing conditions.

14. In the process of purifying metallic cadmium containing zinc by treatment with fused caustic alkali, the improvement which comprises treating the impure cadmium with a caustic alkali containing a salt selected from the class consisting of alkali and alkaline earth chlorides and fluorides.

WILLIAM J. O'BRIEN.